United States Patent [19]

Lin

[11] Patent Number: 5,455,858
[45] Date of Patent: Oct. 3, 1995

[54] METHOD FOR AUTOMATICALLY COMPOSING A TELEPHONE DIALING STRING

[75] Inventor: Lee M. Lin, Cupertino, Calif.

[73] Assignee: Apple Computer, Inc., Cupertino, Calif.

[21] Appl. No.: 130,475

[22] Filed: Oct. 1, 1993

[51] Int. Cl.[6] .................................................... H04M 1/27
[52] U.S. Cl. ........................ 379/355; 379/354; 379/356; 379/357; 379/216
[58] Field of Search ................................. 379/355, 354, 379/356, 357, 216

[56] References Cited

U.S. PATENT DOCUMENTS

| | | | |
|---|---|---|---|
| 4,342,882 | 8/1982 | Gravenhorst et al. | 379/355 |
| 4,945,557 | 7/1990 | Kaneuchi et al. | 379/67 |
| 5,268,959 | 12/1993 | Hong | 379/355 |

OTHER PUBLICATIONS

"Power Book Products User Guide", by Global Village Communication, Inc., Edition 1, (1990–1992), pp. 1–16.

*Primary Examiner*—Jeffery A. Hofsass
*Assistant Examiner*—Jacques M. Saint-Surin
*Attorney, Agent, or Firm*—Mark A. Aaker

[57] ABSTRACT

A method for automatically composing a telephone dialing string for a telecommunication device having a processor, storage, and a connection to an external telephone system, by storing configuration information for a current location of the telecommunication device in fields for local country code and local area code; by storing configuration information for dialing prefixes for a current external telephone system connected to the telecommunication device in fields for a prefix for a local call, prefix for a long distance call, and prefix for an international call; and by storing a desired telephone number in fields for a desired country code, a desired area code, and a desired telephone number. Then, forming a telephone dialing string by the processor comparing like fields of the desired telephone number to the configuration information for a current location to determine the need for international, long distance and local access prefixes followed by non-redundant country code, area code and telephone number information; and sending the telephone dialing string to the external telephone system.

7 Claims, 3 Drawing Sheets

••• From phone number

•••To phone number

METHOD FOR AUTOMATICALLY COMPOSING A TELEPHONE DIALING STRING

BACKGROUND OF THE INVENTION

This invention relates to a method of forming a telephone dialing string for a telecommunication device such as a computer with a modem.

A portion of the disclosure of this patent document contains material which is subject to copyright protection. The copyright owner has no objection to the facsimile reproduction by anyone of the patent document or the patent disclosure, as it appears in the Patent and trademark Office patent file or records, but otherwise reserves all copyright rights whatsoever.

One use of computers is to store name and telephone number information, such as an electronic "Address Book". The computer can be used to dial either stored or manually entered telephone numbers.

As an example, FIG. 1 shows a typical prior art personal computer having storage, display, processor, and input/output devices such as a keyboard and modem. Telephone numbers can be stored on the computer, viewed on the display, manipulated by the processor and dialed via the modem.

FIG. 2 shows how a telephone number can be entered in a prior art telephone dialing program. The desired number is entered in a single field as a string of digits which may include prefixes such as an area code.

The telephone dialing program examines the entered telephone number string, and compares it to stored configuration information to determine how to form a telephone dialing string to be sent to the telephone system.

For local calls within the same area code, the telephone dialing program may need to eliminate the area code from the telephone number when forming the telephone dialing string. For long distance calls, the telephone dialing program may need to add additional prefixes to the telephone number when forming the telephone dialing string. For calls being sent through a PBX telephone system, the telephone dialing program may need to add an access number prefix to the telephone number when forming the telephone dialing string.

To properly form the telephone dialing string, the computer needs certain configuration information. FIG. 3 shows the configuration information that can be entered into one prior art telephone dialing program, the HyperCard™ 2.1 Phone Dialer by Apple Computer, Inc. The program allows the user to select dialing by the computer's speaker or modem output, depending on how connection is made to the external telephone system. (FIG. 3 at 10 and 11.) To connect to a telephone line and dial a particular telephone number, appropriate dialing prefixes may be necessary. Examples of these prefixes are an area code (FIG. 3 at 12), a PBX code to get an outside line (FIG. 3 at 14), a long distance access code (FIG. 3 at 16) and an international access code (FIG. 3 at 18). After configuration information such as these prefixes have been set, the telephone dialing program can generate a telephone dialing string from the prefixes and a desired telephone number.

Selecting the correct set of prefixes for the telephone dialing string can be a complicated problem, since the correct set of prefixes varies in relation to each telephone number desired to be called, the settings of the configuration information, and the country and telephone system being used.

As a simple example, in the United States, telephone numbers within the local area code can be dialed without an area code prefix. However, when the telephone number is in a different area code, it may be necessary to use a prefix of "1", followed by the area code and the telephone number. Many present telephone dialing programs such as the example HyperCard 2.1 Phone Dialer check the desired telephone number against the local area code to eliminate a redundant local area code from the telephone dialing string.

As a more complicated example, when it is desired to call a telephone number in a foreign country, the prefixes for long distance dialing, international access, country codes, city codes, area codes and telephone numbers must be properly constructed. Many present telephone dialing programs fail to correctly form the telephone dialing string if the stored telephone number includes international access codes, or if the stored foreign telephone number is shorter than a local telephone number, or in other circumstances where the program cannot determine whether the desired telephone number is local, long distance or international. Where the telephone number is entered as a single string, it is easy to confuse which digits may be a country code, area code, or phone number.

While errors in forming the telephone dialing string can be noticed and corrected by the computer user, it is not always easy to correct the problem, since both the configuration information and the telephone number may need to be edited to properly "fool" the program into forming a correct string according to its "invisible" internal rules. It is desired that telephone dialing strings can be automatically constructed for any current configuration information and any desired telephone number, especially so that unattended operation of the computer can be allowed, for example to allow the computer to automatically call an electronic mail system and download messages.

SUMMARY OF THE INVENTION

A method for automatically composing a telephone dialing string for a telecommunication device having a processor, storage, and a connection to an external telephone system, comprising:

storing configuration information for a current location of the telecommunication device in fields for local country code and local area code;

storing configuration information for dialing prefixes for a current external telephone system connected to the telecommunication device in fields for a prefix for a local call, prefix for a long distance call and prefix for an international call;

storing a desired telephone number in fields for a desired country code, a desired area code and a desired telephone number;

forming a telephone dialing string by the processor comparing like fields of the desired telephone number to the configuration information for a current location to determine the need for international, long distance and local access prefixes followed by non-redundant country code, area code and telephone number information; and sending the telephone dialing string to the external telephone system.

DETAILED DESCRIPTION

This invention provides a method of automatically composing a telephone dialing string with reduced errors. The invention is useful in programs which run on a telecommunication device having a processor, storage, and a connection to an external telephone system. One key to the invention is the storage of configuration information and the desired telephone number in separate fields. The use of separate fields improves the ability of the telephone dialing program to compare fields and properly construct a telephone dialing string.

Figure 1:
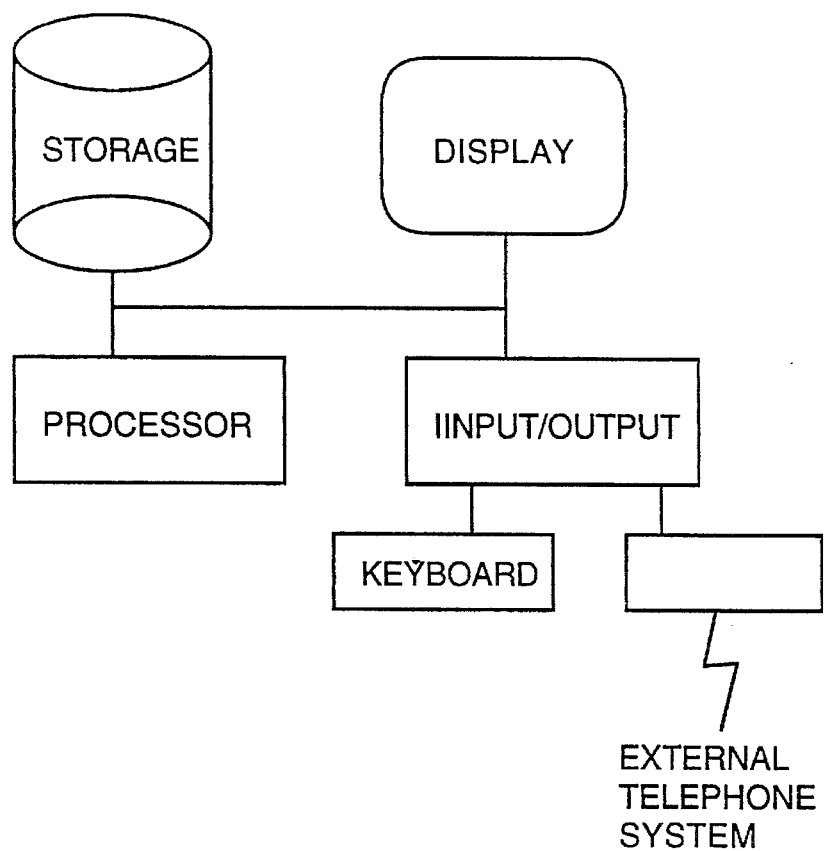
FIG. 1 shows a typical prior art personal computer.
Figure 2:
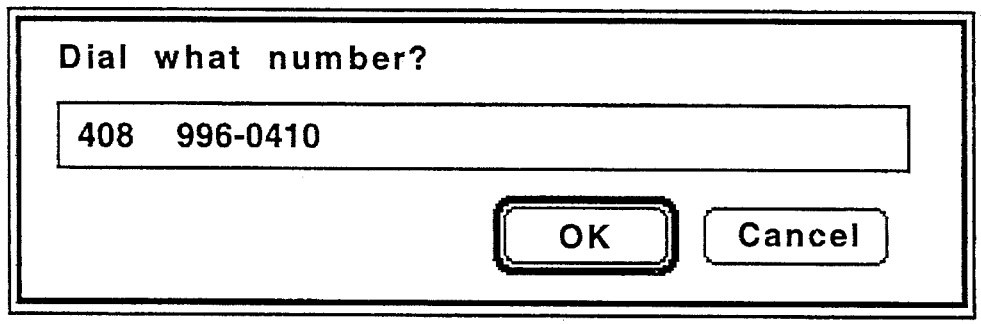
FIG. 2 shows how a telephone number can be entered in a prior art telephone dialing program.
Figure 3:
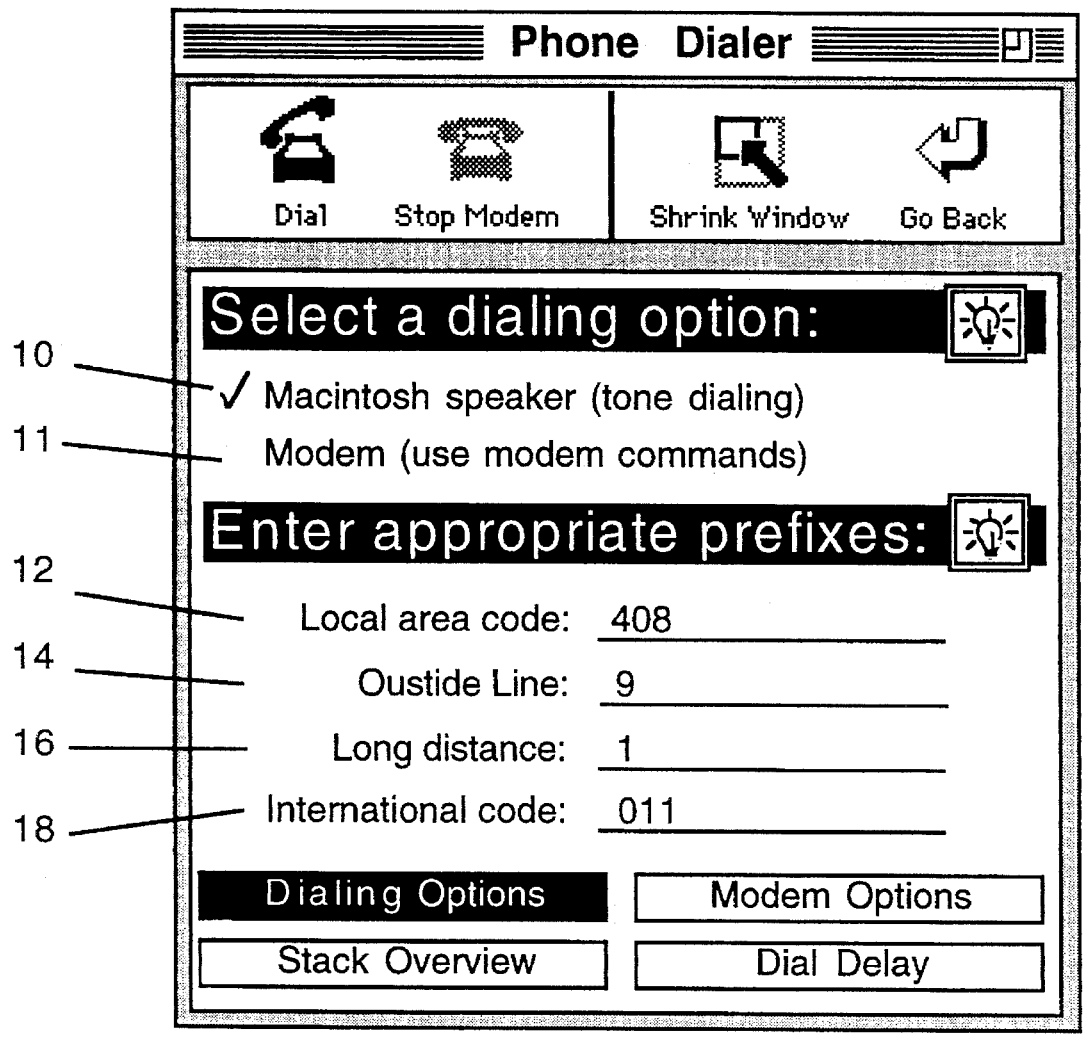
FIG. 3 shows the configuration information that can be entered into one prior art telephone dialing program, the HyperCard™ 2.1 Phone Dialer by Apple Computer, Inc.
Figure 4:
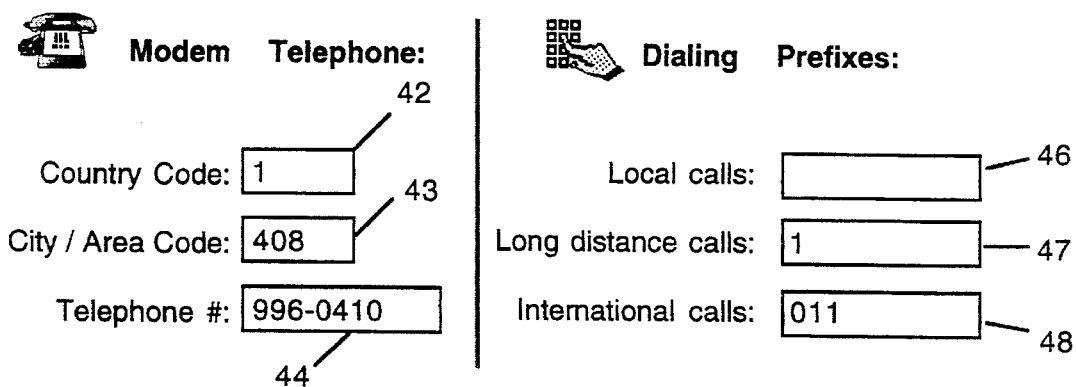
FIG. 4 shows the setting of configuration information, dialing prefixes, and a desired telephone number for use in a method in accordance with the invention.
Figure 4:
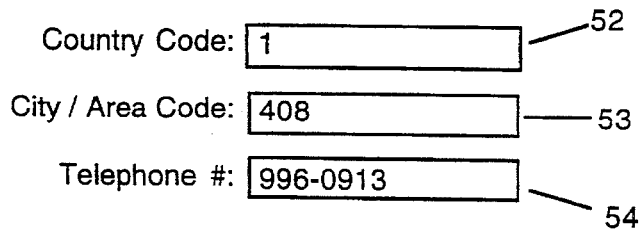

FIG. 4 shows the setting of configuration information, dialing prefixes, and a desired telephone number for use in a method in accordance with the invention. A first set of fields stores local configuration information for a current location of the telecommunication device. Included are a field for storing a local country code (FIG. 4 at 42) and a field for storing a local area code (FIG. 4 at 43). Also shown is a field for storing a telephone number of the current computer location (FIG. 4 at 44).

A second set of fields stores configuration information for dialing prefixes for a current external telephone system connected to the telecommunication device. Included are a field for a prefix for a local call (FIG. 4 at 46), a field for a prefix for a long distance call (FIG. 4 at 47), and a field for a prefix for an international call (FIG. 4 at 48). In telephone systems such as a PBX, it may be necessary to first dial a "9" to get an outside line. In such case, all three prefix fields should store an initial "9" along with other prefix numbers. If a prefix of "9" obtains a local telephone line, while a prefix of "8" obtains a long distance line, then the local and long distance fields would store separate prefixes as appropriate. It should be apparent that the use of separated fields provides more options and the ability to be more specific in setting the prefixes than in prior art systems.

A third set of fields stores the telephone number desired to be called, obtained either by interaction with the user of the computer, or extracted automatically, for example, from a stored address book. Included are a field for a desired country code (FIG. 4 at 52), a field for a desired area code (FIG. 4 at 53), and a field for a desired telephone number (FIG. 4 at 54). If a field is left blank, it can be assumed to be the same as the corresponding local configuration field, e.g., the same local area code.

The telephone dialing program and computer processor then form a telephone dialing string by comparing like fields to determine the need for international, long distance, or local access prefixes followed by non-redundant country code, area code and telephone number information as needed. In detail, this can occur by comparing the stored local country code field to the desired country code field, and if they do not match and the desired country code is not blank, forming the telephone dialing string by the prefix for an international call followed by the desired country code, followed by the desired area code, followed by the desired telephone number, and if they do match or the desired country code is blank, forming the telephone dialing string by forming a telephone dialing string by the processor comparing the stored local area code field to the desired area code field, and if they match forming the telephone dialing string by the prefix for a local call followed by the desired telephone number, and if they do not match, forming the telephone dialing string by the prefix for a long distance call followed by the desired area code, followed by the desired telephone number. It should be apparent that the use of separated fields provides the ability to be more specific, and that separate fields are useful in the comparison process and reduce errors in constructing the telephone dialing string.

After the telephone dialing string is formed, it is sent to the external telephone system, for example by use of the telecommunication device's modem. If desired, the telephone dialing string can be displayed for verification or change by the user, but fully automatic, unattended operation is possible.

Other embodiments and variations of the invention will be apparent to one skilled in the art from a consideration of the specification drawings, and claims. It is intended that the scope of the invention be limited only by the scope of the following claims.

I claim:

1. A method for automatically composing a telephone dialing string for a telecommunication device having a processor, storage, and a connection to an external telephone system, comprising:

storing configuration information for a current location of the telecommunication device in fields with at least a field for storing a local area code;

storing configuration information for dialing prefixes for a current external telephone system connected to the telecommunication device in fields with at least a field for a prefix for a local call, and a field for a prefix for a long distance call;

storing a telephone number desired to be called in fields with at least a field for a desired area code, and a field for a desired telephone number;

forming a telephone dialing string by the processor comparing the stored local area code field to the desired area code field, and if they match forming the telephone dialing string including the prefix for a local call followed by the desired telephone number, and if they do not match, forming the telephone dialing string including the prefix for a long distance call followed by the desired area code, followed by the desired telephone number, and sending said telephone dialing string to said external telephone system.

2. A method for automatically composing a telephone dialing string as in claim 1 further comprising: storing configuration information for a current location in a field for a country code; storing configuration information for dialing prefixes in a field for a prefix for an international call; and storing a portion of a telephone number desired to be called in a field for a desired country code.

3. A method for automatically composing a telephone dialing string as in claim 1 further comprising storing the contents of said fields on the computer, viewing the contents of said fields on a display, and editing the contents of said fields by the processor and an input device.

4. A method for automatically composing a telephone dialing string for a telecommunication device having a processor, storage, and a connection to an external telephone system, comprising:

storing configuration information for a current location of the telecommunication device in fields with at least a field for storing a local country code and a field for storing a local area code;

storing configuration information for dialing prefixes for a current external telephone system connected to the telecommunication device in fields with at least a field for a prefix for a local call, a field for a prefix for a long distance call, and a field for a prefix for an international call;

storing a telephone number desired to be called in fields with at least a field for a desired country code, a field for a desired area code, and a field for a desired telephone number;

forming a telephone dialing string by the processor comparing the stored local country code field to the desired country code field, and placing in the telephone dialing string a prefix for an international call if needed, followed by the processor comparing the stored local area code field to the desired area code field, and placing in the telephone dialing string a prefix for a long distance call and an area code if needed, followed by the desired telephone number, and sending said telephone dialing string to said external telephone system.

5. A method for automatically composing a telephone dialing string as in claim 4 further comprising storing the contents of said fields on the computer, viewing the contents of said fields on a display, and editing the contents of said fields by the processor and an input device.

6. A method for automatically composing a telephone dialing string for a telecommunication device having a processor, storage, and a connection to an external telephone system, comprising:

storing configuration information for a current location of the telecommunication device in fields with at least a field for storing a local country code and a field for storing a local area code;

storing configuration information for dialing prefixes for a current external telephone system connected to the telecommunication device in fields with at least a field for a prefix for a local call, a field for a prefix for a long distance call, and a field for a prefix for an international call;

storing a telephone number desired to be called in fields with at least a field for a desired country code, a field for a desired area code, and a field for a desired telephone number;

forming a telephone dialing string by the processor comparing the stored local country code field to the desired country code field, and for the condition that they do not match and the desired country code is not blank, forming the telephone dialing string by the prefix for an international call followed by the desired country code, followed by the desired area code, followed by the desired telephone number, and for either one of the two conditions that they do match and the desired country code is blank, forming the telephone dialing string by the processor comparing the stored local area code field to the desired area code field, and if they match forming the telephone dialing string by the prefix for a local call followed by the desired telephone number, and if they do not match, forming the telephone dialing string by the prefix for a long distance call followed by the desired area code, followed by the desired telephone number, and sending said telephone dialing string to said external telephone system.

7. A method for automatically composing a telephone dialing string as in claim 6 further comprising storing the contents of said fields on the computer, viewing the contents of said fields on a display, and editing the contents of said fields by the processor and an input device.

* * * * *